(12) United States Patent
Benthaus et al.

(10) Patent No.: US 6,328,777 B1
(45) Date of Patent: Dec. 11, 2001

(54) FILTER SYSTEM

(75) Inventors: Oliver Benthaus; Walter Best; Wolfgang Schafer, all of Duren; Uwe Schumacher, Stolberg, all of (DE)

(73) Assignee: Thomas Josef Heimbach Gesellschaft mit beschrankter Haftung & Co. (DE)

( * ) Notice: Subject to any disclaimer, the term of this patent is extended or adjusted under 35 U.S.C. 154(b) by 0 days.

(21) Appl. No.: 09/471,151

(22) Filed: Dec. 23, 1999

(30) Foreign Application Priority Data

Dec. 23, 1998 (DE) .............................. 298 22 871

(51) Int. Cl.$^7$ .................................. B01D 29/62
(52) U.S. Cl. .............. 55/385.3; 55/483; 55/523; 55/529
(58) Field of Search .............. 55/523, 522, 527, 55/529, DIG. 10, DIG. 30, 385.3, 482, 483

(56) References Cited

U.S. PATENT DOCUMENTS

| | | |
|---|---|---|
| 4,363,644 | 12/1982 | Sato et al. . |
| 4,420,316 * | 12/1983 | Frost et al. .............................. 55/523 |
| 4,436,538 | 3/1984 | Tomita et al. . |
| 4,897,096 | 1/1990 | Pischinger et al. . |
| 5,454,845 * | 10/1995 | Anahara et al. ........................ 55/523 |
| 5,536,285 * | 7/1996 | Isaksson et al. ....................... 55/523 |
| 5,601,626 * | 2/1997 | Hori et al. .............................. 55/523 |
| 5,641,332 * | 6/1997 | Faber et al. ............................. 55/523 |
| 5,700,373 * | 12/1997 | Ritland et al. ......................... 55/523 |
| 5,855,781 * | 1/1999 | Yorita et al. ........................... 55/523 |
| 5,914,187 * | 6/1999 | Narose et al. .......................... 55/523 |
| 5,964,991 * | 10/1999 | Kawasaki et al. ...................... 55/523 |
| 6,101,793 * | 8/2000 | Nagai et al. ............................ 55/523 |
| 6,126,833 * | 10/2000 | Stobbe et al. .......................... 55/523 |
| 6,183,609 * | 2/2001 | Kawasaki et al. ...................... 55/523 |

FOREIGN PATENT DOCUMENTS

| | | |
|---|---|---|
| 3823205 | 1/1990 | (DE) . |
| 3836697 | 5/1990 | (DE) . |
| 40263754 | 1/1992 | (DE) . |
| 0336883 | 10/1989 | (EP) . |
| 0446422 | 9/1991 | (EP) . |
| 0454346 | 10/1991 | (EP) . |
| 0522245 | 1/1993 | (EP) . |
| 9313303 | 7/1993 | (WO) . |

* cited by examiner

Primary Examiner—David A. Simmons
Assistant Examiner—Minh-Chau T. Pham
(74) Attorney, Agent, or Firm—Liniak, Berenato, Longacre & White, LLC

(57) ABSTRACT

A filter system includes a longitudinally extending housing having a housing inlet and a housing outlet. A plurality of longitudinally extending, cross-sectionally rectangular cassette cases are exchangeably mounted within the housing. Each cassette case has an inlet associated with the housing inlet for receiving a medium to be filtered, and an outlet associated with said housing outlet for supplying filtered medium thereto. A plurality of longitudinally extending, cross-sectionally rectangular apertured filter elements formed of a ceramic filter medium are affixed within each cassette case. Each filter element of each cassette case extends along and is disposed adjacent at least one filter element of the associated cassette case. Each filter element has an inlet for receiving medium to be filtered and an outlet from which filtered medium flows.

33 Claims, 2 Drawing Sheets

FILTER SYSTEM

FIELD OF THE INVENTION

The invention relates to a filter system having a filter-system housing receiving a plurality of juxtaposed intrinsically stable filter elements made of a ceramic, in particular SiC, said elements comprising porous, longitudinal walls crossed by the medium being filtered.

DESCRIPTION OF THE RELATED ART

When filtering hot gases, for instance diesel engine exhaust gases or waste gases from large plants such as trash incinerators etc. ceramic tubular filter elements are being increasingly used which are fitted with porous, filtering outer walls being crossed by the material being filtered. Where a single filter element is insufficient, a plurality of such filter elements are juxtaposed and are then jointly crossed by such flows. Where such filter elements are in the form of candles and therefore their intrinsic stability is low or non-existent, they are slipped onto support pipes perforated by a pattern of holes (See German patent documents A 38 23 205; A 38 36 697 and C 40 26 375). If the filter elements are stable on their own, for instance being molded from sintered SiC, they are mounted inside the filter-system housing in mutually spaced manner, being affixed and held in place at their ends (European patent documents A 0 446 442; A 0 522 245; A 0 454 346; and A 0 336 883, FIG. 7).

The above described filter systems incur the drawback of excessive specific bulk. Furthermore, exchanging the filter elements is a difficult matter. Again, the filter elements—which are made of a highly brittle ceramic—are unprotected when being moved to or from the filter system. Affixation of the filter elements in part raises the danger that thermally caused changes in the dimensions of the filter-system housing shall entail stresses in the filter elements, and, in extreme cases, their destruction.

Moreover ceramic filter elements also of circular contour are known, which inside are partitioned, in checkerboard or honeycomb manner by porous, filtering longitudinal walls, into alternating inflow and outflow canals. The inflow canals are open at the inflow side and closed at the exhaust side, whereas the outflow canals are closed at the inflow side and open at the exhaust side (European patent document A 0 366 883 FIGS. 5 and 6 and U.S. Pat. No. 4,897,096). The specific bulk of such filter elements is much less and their intrinsic stability is comparatively high. The said documents do not disclose, or imply, arrays of such filter elements. However, if they are configured in the manner of the tubular filter elements, difficulties remain in installation and removal. Also, in view of their brittleness, there is risk of damage when moving them.

With respect to filter systems having filter elements entirely consisting of a porous ceramic and therefore being crossed by the gases in the axial direction, it is known to configure several such filter elements within a single housing of circular cross-section (WO93/13303) or of oval cross-section (U.S. Pat. No. 4,436,538). The cross-sections of the filter elements are quarter-circle or half-circle and these components are sealed from each other and relative to the outside by insulating layers consisting a heat-expanding material (WO93/13303). A multiple configuration of such assemblies of filter elements is not provided. This absence also applies to the version shown in U.S. Pat. No. 4,363,644 wherein the inside space of a cross-sectionally circular, ceramic support body is partitioned in part, a porous material being produced and sintered to the support body.

BRIEF SUMMARY OF THE INVENTION

The objective of the invention is to design a filter system having a plurality of filter elements, of which the filtering longitudinal walls are crossed by gases, in such manner that they may be easily installed and replaced and that they shall be protected against damage while being moved. Another objective is to install the filter elements in such manner as to be substantially sheltered from the filter-system housing's warping or stresses.

This problem is solved by the invention by the outer cross-section of the filter elements being rectangular and in that a plurality of filter elements is combined with others into a cross-sectionally rectangular sub-assembly of filter elements, each filter-component sub-assembly being mounted within a cassette case while forming a particular filter cassette, and in that the filter cassettes are exchangeably mounted inside the filter-system housing.

Accordingly the basic concept of the invention is to combine some of the filter elements into filter-component sub-assemblies and to mount such within one filter cassette each, which, as a unit, can be installed into and removed from the filter-system housing. As a result the filter elements may be configured very tightly. Installation and removal are simple and rapid. The cassette case protects the filter elements against damage both in installation and removal and when they are being moved. Warps and expansions of the filter-system housing are absorbed by the cassette case or even are shunted from it if appropriate supports are provided, as a result of which the filter elements per se are kept free from stresses. By combining a plurality of such filter cassettes, a filter system may be made almost arbitrarily large. High-grade steel is especially appropriate for the cassette housing.

The filter cassettes will be combined in especially compact manner if a filter cassette is flanked at least at two sides with a neighboring filter cassette in order to make the resultant cross-section rectangular.

In a preferred embodiment, the filter elements comprise in manner known per se adjacent and alternating inflow and outflow canals partitioned by the porous, filtering longitudinal walls, the inflow canals being open at the inflow side and closed at the exhaust side and the outflow canals being closed at the inflow side and open at the exhaust side. Appropriately the inflow and outflow canals are configured in checkerboard manner, allowing high efficiency in specific bulk relative to the filtering surfaces. The inflow and outflow canals shall be matched to the cross-sectional contour of the filter elements by themselves being cross-sectional rectangular, preferably square. The outer walls of the filter elements appropriately may be hermetic, though they should be at least impermeable to particles.

In an especially advantageous combination, a filter-component sub-assembly consists of four filter elements appropriately configured in such manner that neighboring filter elements are present at two sides of each filter element. It was found that a configuration of four filter elements offers a number of advantages. By such geometric interlocking, the filter elements are precluded from being forced out. Moreover the gap dimensions for the insulating layers can be observed more closely thereby. Size, weight and costs all are within a reasonable range. Simple cascading for electrical heating can be implemented by series connections.

In a further embodiment of the invention, the filter cassettes are supported in at least two mutually spaced cross-walls, though being axially affixed only to one. This kind of support prevents transmitting expansion or warping of the filter-system housing on the filter cassettes which thereby remain stress-free even when the gases being filtered undergo large temperature changes. In a development of this concept, the filter cassettes may be fitted with a flange resting against the inflow side of one of the cross-walls, and preferably the axial affixation of the filter cassettes shall be implemented by means of this flange. In this design the exhaust-side cross-wall need only be fitted with matching seating clearances for the filter cassettes. At the latter wall, axial affixation is neither required nor appropriate.

It is understood that the filter elements are protected best when the cassette cases enclose the filter-component sub-assemblies over their entire length.

Advantageously insulating layers are present between the filter elements and between the filter elements and the cassette housing, said insulating layers being made of a thermally expanding material, whereby the filter elements are commensurately decoupled and modest changes in the shapes of the filter elements and of the cassette housing can be absorbed by the insulating layers. Furthermore the insulating layers affix the filter elements in the axial direction, also they compensate for different thermal expansions of the cassette housing and the filter elements, and provide sealing, damping and electrical insulation.

In the invention, furthermore, the filter-system housing comprises insulated feedthroughs for electrical conductors, these feedthroughs constituting hermetic sealing and thermal insulation.

BRIEF DESCRIPTION OF THE SEVERAL VIEWS OF THE DRAWINGS

The invention is elucidated by an illustrative embodiment shown in the drawing.

DETAILED DESCRIPTION OF THE INVENTION

Figure 1:
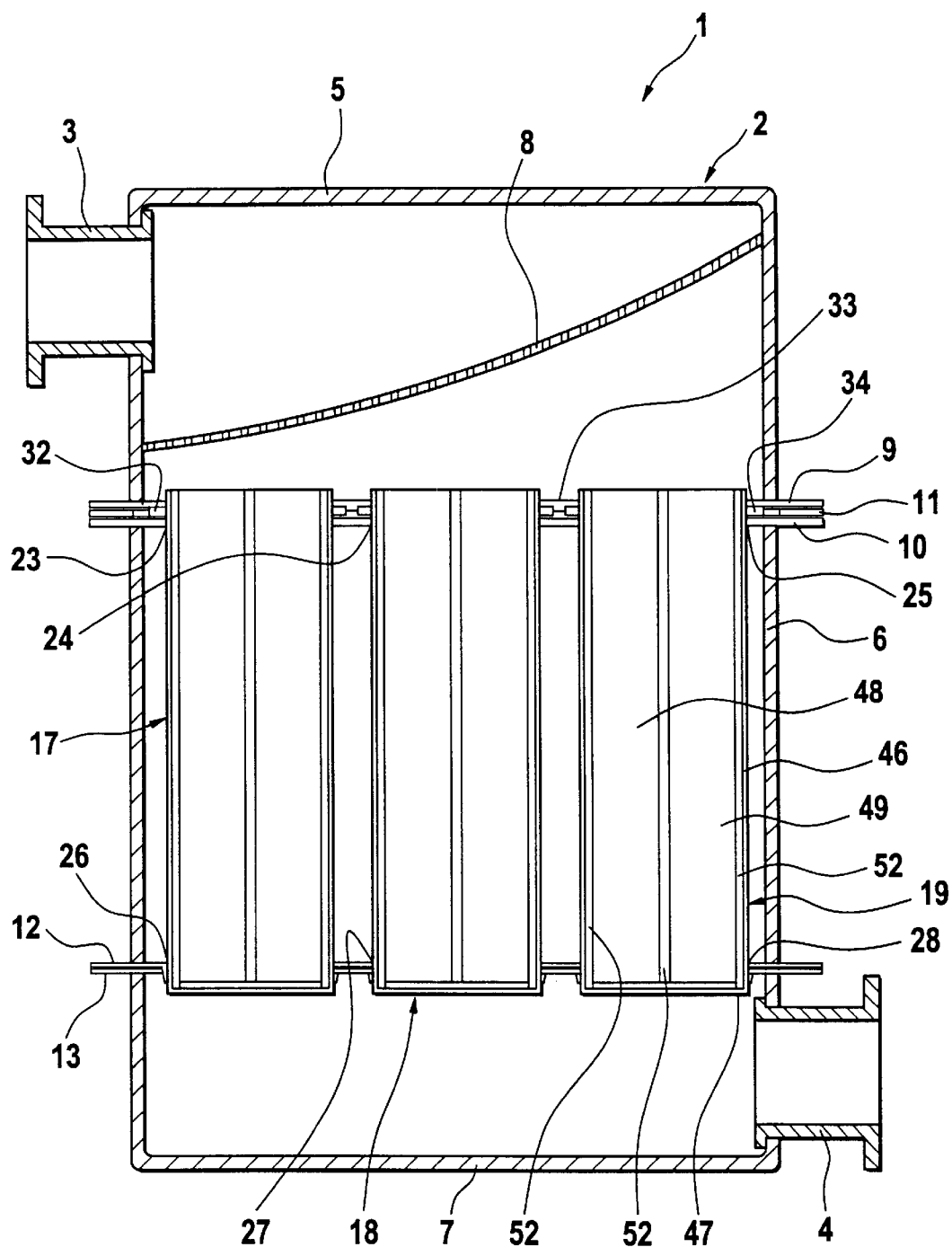
FIG. 1 is a longitudinal section of a filter system of the invention.

The filter system 1 shown in FIG. 1 is fitted with a cubic steel housing 2 comprising an inflow connecting piece 3 at its upper part and an outflow connecting piece 4 at the lower part on the other side of the housing 2. The filter-system housing consists of three parts, namely an inflow hood 5, a middle part 6 and an outflow hood 7.

The inflow hood 5 is partitioned by a bent, perforated sheet metal 8. The gas to be purified and entering through the inflow connecting piece 3 crosses the perforated sheet metal 8, the gas flow being evened out across the cross-section of the filter-system housing 2. The lower edge of the inflow hood 5 is fitted with an outwardly projecting flange 9 running over the full periphery.

The middle part 6 is cross-sectionally square and is sealed by a cross-wall 10 from the inflow hood 5. The cross-wall 10 projects outward as far as the flange 9 to which it is screw-affixed, sealing being implemented by an inserted sealing strip 11. The exhaust side of the middle part 11 also is fitted with a cross-wall 12 which also comprises a segment outwardly projecting like a flange. This segment corresponds to the flange 13 which is hermetically connected to the upper edge of the outflow hood 7 and which fully encloses said hood. The cross-wall 12 and the flange 13 also are screwed to each other in sealed manner.

Figure 2:
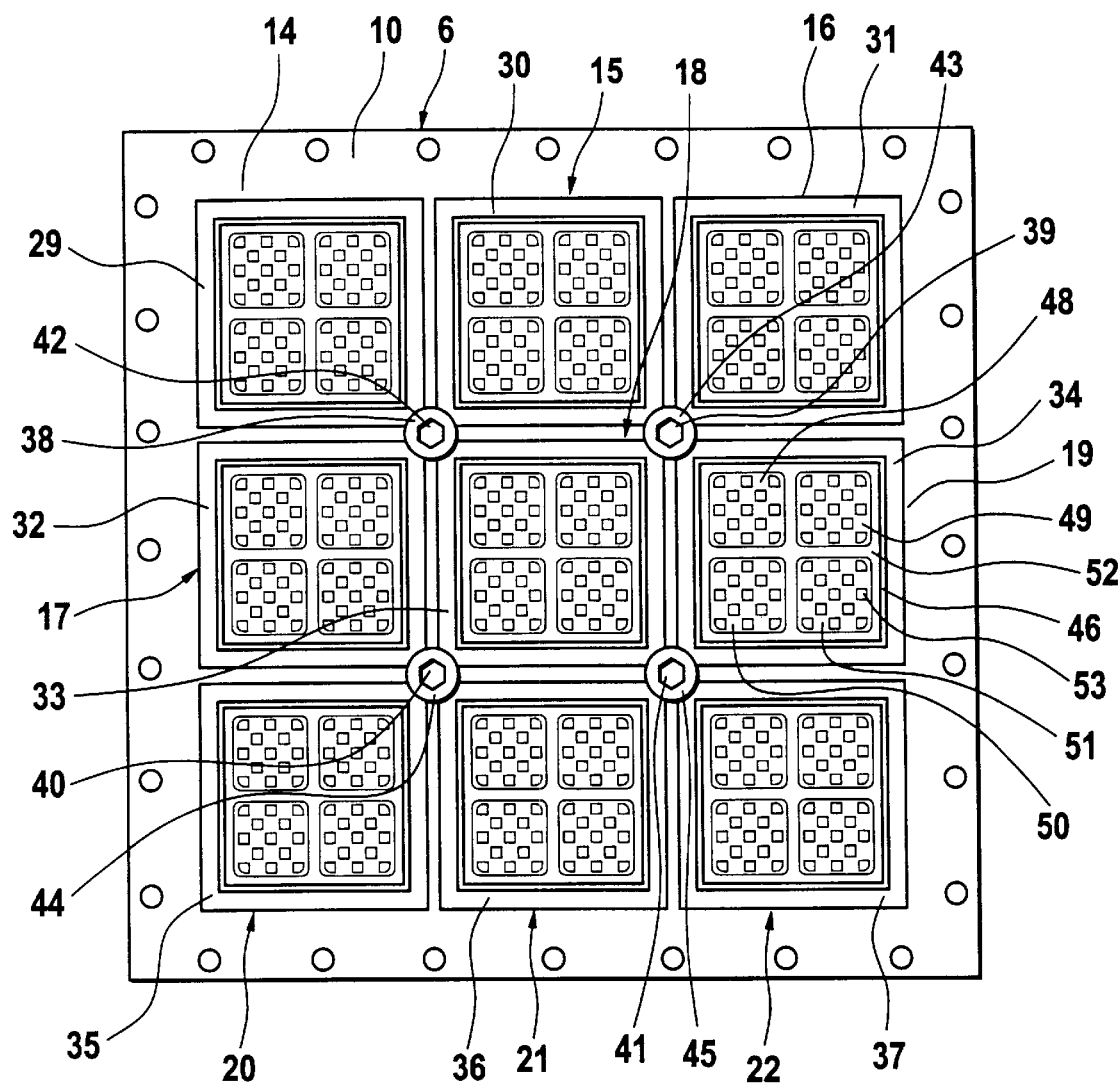
FIG. 2 is a view of the intake side of the filter cassettes of the filter system of FIG. 1.

The cross-walls 10, 12 and hence also the middle part 6 are crossed by filter cassettes 14–22 of which the configuration and numbers are shown in FIG. 2. As seen in FIG. 2, there are a total of nine filter cassettes 14–22 which are configured in such a way that each time three filter cassettes 14, 15, 16 and 17, 18, 19 and 20, 21, 22 resp. will be mutually adjacent and three filter cassettes 14, 17, 20 and 15, 18, 21 and 16, 19, 22 are superposed, entailing a cross-sectionally square surface of filter cassettes 14–22. FIG. 1 only shows the middle row of filter cassettes 17, 18, 19. The filter cassettes 14–22 each are received in apertures 23–28 in the cross-walls 10, 12 matching their outer periphery.

At the inflow side, the filter cassettes 14–22 comprises flanges 29–37 resting by means of seals against the inflow side of the outflow hood 7 and thereby preventing the filter cassettes 14–22 from slipping. Screws 38, 39, 40, 41 are present at the sites abutted by the edges of four flanges 29–37 to press washers 42, 43, 44, 45 against the inflow sides of the flanges 29–37 and in this manner to affix the flanges 29–37 against the cross-wall 10 and to axially immobilize them. In addition the inwardly projecting segment of the flange 9 of the inflow stub 3 overlaps the outward portions of the flanges 29–32 and 34–37.

The filter cassettes 14–22 are guided solely within the apertures 26, 27, 28 in the exhaust-side cross-wall 12, that is the cassettes 14–22 are not held in other ways. Accordingly when exchanging the filter cassettes 14–22, all that is required is to take off the inflow hood 5 and to remove the screws 38, 39, 40, 41 together with the washers 42, 43, 44, 45. Thereupon the filter cassettes 14–22 can be pulled out upwards and be replaced with new ones.

The filter cassettes 14–22 being identical, they can all be described in relation to the filter cassette 19. The filter cassette 19 has a tubular, cross-sectionally square cassette case 46, the flange 34 being affixed, or fused into the outside of said case 46. The cassette case 46 is made of a heat resistant steel or high-grade steel. This cassette case 46 is fitted at its lower side with an inwardly projecting support strip 47.

A total of four filter elements 48, 49, 50, 51 are configured squarely, that is each time two next to each other inside the cassette case 46. These elements run over almost the full length of the cassette case 46 and are identical. They are made of sintered SiC, that is they are intrinsically stable. The filter elements 48, 49, 50, 51 are separated from each other by an insulating layer 52 consisting of a thermally expanding ceramic, illustratively INTERAM made by 3M. Upon application of heat and on account of expansion, the insulating layer 52 fixes in place the filter elements 48, 49, 50, 51 inside the cassette case 46, through independently of latter and of each other.

The filter elements 48, 49, 50, 51 being identical, and furthermore being also identical with all other filter elements in the filter cassettes 14–22, the design of the filter elements 48, 49, 50, 51 will be elucidated in relation to filter element 51. Basically the filter element 51 is designed in the manner disclosed in U.S. Pat. No. 4,897,096 and in the European patent document A 0 336 883, except that the cross-sectional contour of the filter element 49 is not circular but square. The filter element 51 is crossed by canals which also are cross-sectionally square and which are separated from each other by porous, filtering longitudinal walls. FIG. 2 only shows the inflow apertures of the flow canals illustratively denoted with 53. The inflow canals 53 are hermetically closed at the end on the exhaust side of the filter element 49. The open outflow canals at the exhaust side of the filter element 49 are hermetically closed in the view of FIG. 2 and they run between the inflow canals 53. In this manner the gas flowing into the inflow canals 53 is forced to cross the longitudinal walls between the inflow canals 53 and the outflow canals, the particles contained in the gas, soot for instance, being separated, and purified gas enters the outflow canals and can be exhausted through the outflow hood 7 and the outflow connecting piece 4 from the filter system 1. An appropriate material for the filter elements 48, 49, 50, 51 illustratively is that employed in the European patent document A 0 796 830.

What is claimed is:

1. A filter system, comprising:
   a) a longitudinally extending housing having an inlet and an outlet;
   b) a plurality of longitudinally extending, cross-sectionally rectangular cassette cases exchangeably mounted within said housing, each cassette case having an inlet associated with said housing inlet for receiving a medium to be filtered and an outlet associated with said housing outlet for supplying filtered medium thereto; and
   c) a plurality of longitudinally extending, cross-sectionally rectangular apertured filter elements formed of a ceramic filter medium affixed within each cassette case, each filter element of each cassette case extending along and disposed adjacent at least one filter element of the associated cassette case and each filter element having an inlet for receiving medium to be filtered and an outlet from which filtered medium flows.

2. The filter system of claim 1, wherein:
   a) each cassette case is adjacent two cassette cases disposed within said housing.

3. The filter system of claim 1, wherein:
   a) each filter element comprises adjacent and alternating inflow and outflow canals separated by porous longitudinally extending filtering walls, the inflow canals being open at said cassette case inlet and closed at said cassette case outlet and the outflow canals being closed at said cassette case inlet and open at said cassette case outlet.

4. The filter system of claim 3, wherein:
   a) the inflow and outflow canals are cross-sectionally rectangular.

5. The filter system of claim 1, wherein:
   a) the filter elements each have a particle impermeable outer wall.

6. The filter system of claim 5, wherein:
   a) the filter elements each have an hermetic outer wall.

7. The filter system of claim 1, wherein:
   a) at least some of the filter elements are cross-sectionally square.

8. The filter system of claim 1, wherein:
   a) each cassette case comprises four filter elements.

9. The filter system of claim 8, wherein:
   a) each filter element is adjacent two filter elements positioned within the corresponding cassette case.

10. The filter system of claim 1, wherein:
    a) a cross-wall is positioned within said housing proximate said housing inlet; and
    b) said cassette cases are suspended from and supported by said cross-wall.

11. The filter system of claim 1, wherein:
    a) first and second cross-walls are positioned within said housing, said first cross-wall is proximate said housing inlet and said second cross-wall is proximate said housing outlet;
    b) each of said cassette cases is supported by said cross-walls; and
    c) each of said cassette cases is affixed to one of said cross-walls.

12. The filter system of claim 11, wherein:
    a) each of said cassette cases is affixed to said first cross-wall.

13. The filter system of claim 11, wherein:
    a) said second cross-wall includes a plurality of apertures, and each of said cassette cases is received within one of said apertures.

14. The filter system of claim 11, wherein:
    a) a flange extends from each of said cassette cases proximate said cassette case inlet; and
    b) each flange is supported by said first cross-wall.

15. The filter system of claim 1, wherein:
    a) said cassette cases extend longitudinally the length of the corresponding filter elements.

16. The filter system of claim 1, wherein:
    a) an insulating layer is disposed between adjacent filter elements.

17. The filter system of claim 16, wherein:
    a) an insulating layer is disposed between the filter elements and the corresponding cassette cases.

18. The filter system of claim 17, wherein:
    a) said insulating layer is a thermally expandable material.

19. The filter system of claim 1, wherein:
    a) a plurality of insulated feedthroughs are formed in said housing; and
    b) an electrical conductor extends through each of said feedthroughs.

20. The filter system of claim 19, wherein:
    a) each of said feedthroughs is hermetically sealed and thermally insulated.

21. A filter system, comprising:
    a) a longitudinally extending housing having an inlet and an outlet;
    b) at least a first cross-wall extending across said housing, said cross-wall disposed at one of said inlet and said outlet;
    c) a plurality of longitudinally extending, cross-sectionally rectangular cassette cases positioned within said housing, each cassette case having an inlet associated with said housing inlet for receiving a medium to be filtered and an outlet associated with said housing outlet for supplying filtered medium thereto, each of said cassette cases affixed to and supported by said cross-wall, and
    d) a plurality of longitudinally extending, cross-sectionally rectangular filter elements formed of a ceramic filter medium fixed within each cassette case, each filter element of each cassette case extending along and disposed adjacent at least one filter element of the associated cassette case and each filter element having an inlet for receiving medium to be filtered and an outlet from which filtered medium flows.

22. The filter system of claim 21, wherein:
    a) said cross-wall is proximate said housing inlet.

23. The filter system of claim 22, wherein:
    a) a second cross-wall extends across said housing proximate said housing outlet, said second cross-wall having a plurality of apertures through which said cassette cases extend.

24. The filter system of claim 23, wherein:
a) a flange extends from each of said cassette cases; and
b) each flange engages and is supported by said first cross-wall.

25. The filter system of claim 21, wherein:
a) each cassette case is adjacent two cassette cases disposed within said housing.

26. The filter system of claim 25, wherein:
a) each filter element is adjacent two filter elements within the corresponding cassette case.

27. The filter system of claim 26, wherein:
a) an insulating material is disposed between adjacent filter elements within each cassette case.

28. The filter system of claim 27, wherein:
a) said insulating material is disposed between each cassette case and said housing.

29. The filter system of claim 21, wherein:
a) each filter element comprises adjacent and alternating inflow and outflow canals separated by porous longitudinally extending filtering walls, the inflow canals being opened proximate said housing inlet and closed proximate said housing outlet, and said outflow canals being closed proximate said housing inlet and open proximate said housing inlet.

30. The filter system of claim 29, wherein:
a) said inflow and outflow canals are cross-sectionally rectangular.

31. The filter system of claim 30, wherein:
a) the filter elements each have a particle-impermeable outer wall.

32. The filter system of claim 21, wherein:
a) a plurality of insulated feedthroughs are formed in said housing; and
b) an electrical conductor extends through each of said feedthroughs.

33. The filter system of claim 32, wherein:
a) each of said feedthroughs is hermetically sealed and thermally insulated.

* * * * *